United States Patent
Shimakawa

(10) Patent No.: US 7,839,746 B2
(45) Date of Patent: Nov. 23, 2010

(54) OPTICAL DISC APPARATUS AND LIGHT POWER CORRECTING METHOD

(75) Inventor: Shigeru Shimakawa, Mito (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 12/323,313

(22) Filed: Nov. 25, 2008

(65) Prior Publication Data

US 2009/0245042 A1 Oct. 1, 2009

(30) Foreign Application Priority Data

Mar. 28, 2008 (JP) .............................. 2008-088294

(51) Int. Cl.
*G11B 7/00* (2006.01)
(52) U.S. Cl. ..................... 369/53.26; 369/47.5; 369/116
(58) Field of Classification Search ........................ None
See application file for complete search history.

(56) References Cited

U.S. PATENT DOCUMENTS

2007/0019529 A1* 1/2007 Ho .............................. 369/116
2007/0274191 A1* 11/2007 Tanoue et al. ................ 369/116
2008/0084805 A1* 4/2008 Chen ......................... 369/59.11
2009/0086597 A1* 4/2009 Shou et al. ................ 369/47.53

FOREIGN PATENT DOCUMENTS

JP 2004-326841 11/2004

* cited by examiner

*Primary Examiner*—Lixi Chow
(74) *Attorney, Agent, or Firm*—Knobbe, Martens Olson & Bear LLP

(57) ABSTRACT

An optical disc apparatus includes: an obtaining unit obtaining a sensitivity coefficient indicating a relation between a light power of a semiconductor laser and a monitor value; a first deriving unit deriving a first monitor value in setting the light power at a peak power; a second deriving unit deriving a second monitor value in setting the light power at an erase power; a converting unit converting the first and the second monitor values into first and second light power values based on the sensitivity coefficient; a first calculating unit calculating a ratio between the first and the second light power values; a second calculating unit calculating a correction coefficient based on a setting value of a ratio between the peak power and the erase power and a calculation value of the ratio between the first and the second light power values; and a correcting unit correcting the light power of the semiconductor laser based on the correction coefficient.

10 Claims, 3 Drawing Sheets ated with the optical disc D. Controlling a tempera-

OPTICAL DISC APPARATUS AND LIGHT POWER CORRECTING METHOD

CROSS-REFERENCE TO RELATED APPLICATIONS

This application is based upon and claims the benefit of priority from the prior Japanese Patent Application No. 2008-088294, field on Mar. 28, 2008; the entire contents of which are incorporated herein by reference.

BACKGROUND OF THE INVENTION

1. Field of the Invention

The present invention relates to an optical disc apparatus and a light power correcting method.

2. Description of the Related Art

In recording information on an optical disc, especially a rewritable optical disc, it is important to control a peak power and an erase power in terms of a recording quality. The peak power and the erase power respectively represent a power of a laser light to make a recording layer (for example, a phase transition form recording layer) of the optical disc be a liquid crystalline state and an amorphous state (an erase state), and are used in writing on the optical disc. Controlling a temperature of the recording layer by way of the power of the laser light irradiated to the optical disc allows a state of the recording layer to be the liquid crystalline state and the amorphous state.

Writing on the optical disc is controlled using a ratio (a coefficient) $\epsilon$(=the erase power/the peak power) between the peak power and the erase power. For example, a technique that calculates the peak power by means of an arithmetic operation of the detected erase power and the coefficient $\epsilon$ has been disclosed (referring to JP-A 2004-326841 (KOKAI), paragraph number 0042).

BRIEF SUMMARY OF THE INVENTION

However, the above-described technique is to cause an error included in the calculated peak power when the coefficient $\epsilon$ is not appropriate. An object of the present invention is to provide an optical disc apparatus enabling a light power correction and a light power correcting method.

An optical disc apparatus according to one aspect of the present invention includes: a semiconductor laser irradiating an optical disk with a light; a light monitor monitoring an emitted light from the semiconductor laser; an obtaining unit obtaining a sensitivity coefficient indicating a relation between a light power of the semiconductor laser and a monitor value in the light monitor; a first deriving unit deriving a first monitor value in setting the light power of the semiconductor laser at a peak power; a second deriving unit deriving a second monitor value in setting the light power of the semiconductor laser at an erase power; a converting unit converting the first and the second monitor values into first and second light power values based on the sensitivity coefficient; a first calculating unit calculating a ratio between the first and the second light power values; a second calculating unit calculating a correction coefficient based on a setting value of a ratio between the peak power and the erase power and a calculation value of the ratio between the first and the second light power values; and a correcting unit correcting the light power of the semiconductor laser based on the correction coefficient.

A light power correcting method according to one aspect of the present invention includes: obtaining a sensitivity coefficient indicating a relation between a light power of a semiconductor laser irradiating an optical disc with a light and a monitor value in a light monitor; deriving a first monitor value in setting the light power of the semiconductor laser at a peak power; deriving a second monitor value in setting the light power of the semiconductor laser at an erase power; converting the first and the second monitor values into first and second light power values based on the sensitivity coefficient; calculating a ratio of the first and the second light power values; calculating a correction coefficient based on a setting value of a ratio between the peak power and the erase power and a calculation value of the ratio between the first and the second light power values; and correcting the light power of the semiconductor laser based on the correction coefficient.

DETAILED DESCRIPTION OF THE INVENTION

Figure 1:
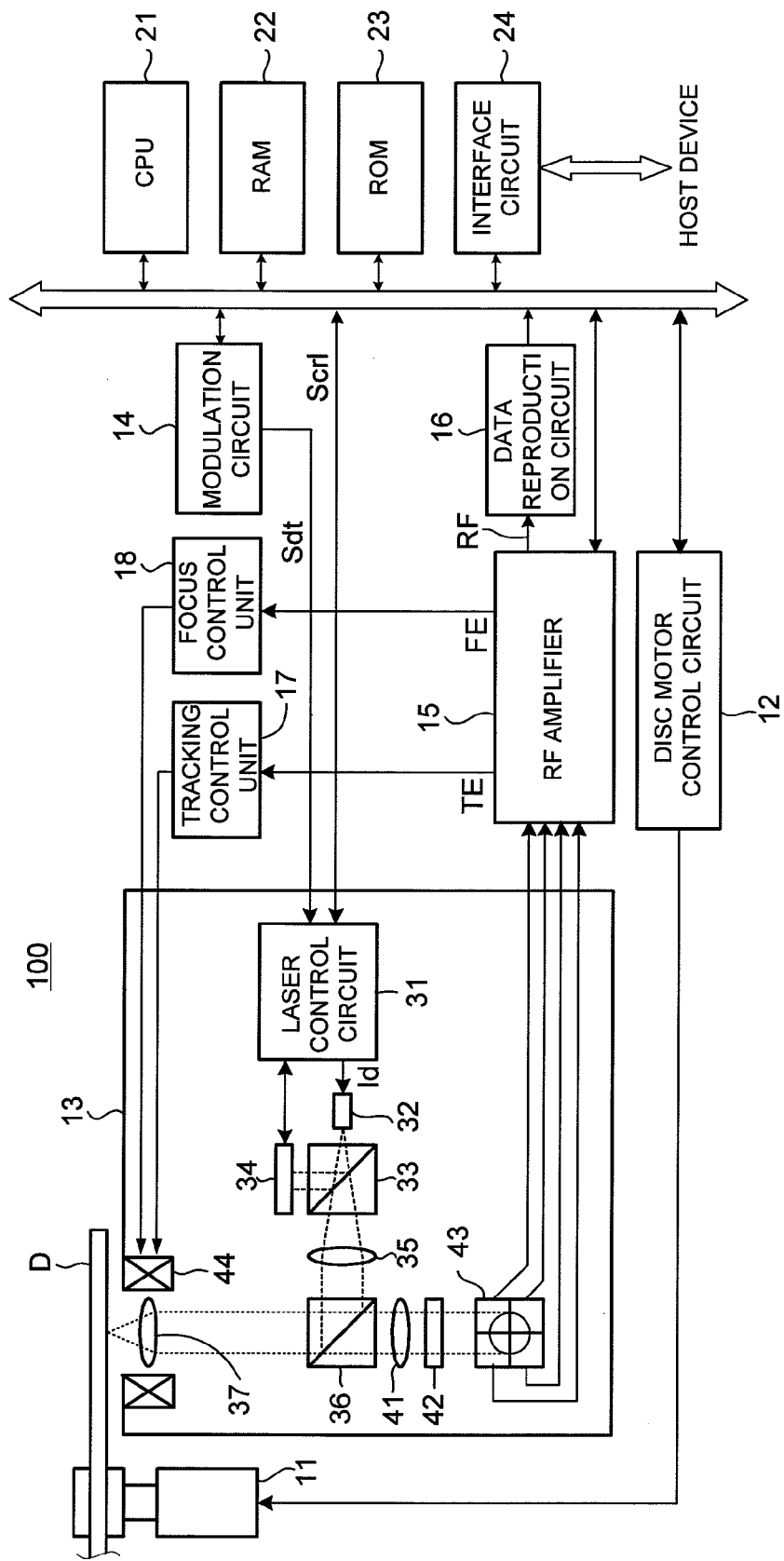
FIG. 1 is a block diagram showing an optical disc apparatus 100 according to one embodiment of the present invention

Hereinafter, embodiments of the present invention will be described in detail with reference to the drawings. FIG. 1 is a block diagram showing an optical disc apparatus 100 according to an embodiment of the present invention. The optical disc apparatus 100 records and reproduces information on/from an optical disc D.

The optical disc D is an information storage medium such as, for example, a DVD (Digital Versatile Disc), an HD-DVD or the like. A groove in a concentric state or a spiral state is made in the disc D. One round of the groove is called a track. User data is recorded by emitting an intensity modulated laser light along the track to make a mark (a pit or the like) In reproducing the data, a laser light weaker than that at a recording time is irradiated along the track. The data is reproduced by detecting a change of a reflected light intensity from the mark on the track.

The optical disc D is driven rotationally by a disc motor 11. The disc motor 11 is controlled in a disc motor control circuit 12. An optical pickup 13 irradiates the optical disc D with a light to record and reproduce information. Namely, the optical pickup 13 functions as a light irradiation unit that irradiates an optical disc with a light to record and reproduce data.

In recording information (making a mark), user data is supplied to a modulation circuit 14 from a host device 25 via an interface circuit 24. The modulation circuit 14 EFM-modulates (for example, 8-14-modulates) the user data and outputs it as a data signal Sdt to a laser control circuit 31.

The laser control circuit 31 supplies a write current (a drive current Id) to a semiconductor laser (a laser diode) 32 based on the data signal Sdt supplied from the modulation circuit 14. A control signal Scr1 from a CPU 21 is used in this event. In reading information, the laser control circuit 31 supplies a read current (a drive current Id) smaller than the write current to the semiconductor laser 32.

A light detector (a front monitor) 34 detects a power of a laser light emitted by the semiconductor laser 32 and supplies a light power detection current Ip to the laser control circuit 31. The light detector 34 functions as a light monitor to monitor an emitted light from the semiconductor laser 32. The laser control circuit 31 controls the semiconductor laser 32. Note that details of the laser control circuit 31 will be described later.

The laser light emitted from the semiconductor laser 32 is irradiated onto the optical disc D via a half prism 33, a collimator lens 35, a half prism 36 and an objective lens 37. A reflected light from the optical disc D is led to a light detector 43 via the objective lens 37, the half prism 36, a condenser lens 41 and a cylindrical lens 42. The light detector 43 is composed of for example, four-divided light detection cells, and detection signals of these light detection cells are output to an RF amplifier 15.

The RF amplifier 15 processes the signal from the light detection cell and generates an RF signal, a tracking error signal TE and a focus error signal FE. The RF signal is a signal made by adding all the signals from the light detection cells in which the reflected light from the mark made on the track of the optical disc D is reflected. The tracking error signal TE indicates a deviation (an error) between a beam spot center of the laser light and a track center. The focus error signal FE is obtained from a difference between diagonal sums of the four-divided light detection cells (an astigmatic method), and indicates a deviation (an error) from a just focus on a recording layer of the optical disc D.

The RF signal is supplied to a data reproduction circuit 16 and the data is reproduced. The tracking error signal TE and the focus error signal FE are respectively supplied to a tracking control unit 17 and a focus control unit 18, and a track drive signal and a focus drive signal are generated. The track drive signal and the focus drive signal are supplied to a drive coil 44, and the objective lens 37 is moved in a tracking direction (a perpendicular direction to an optical axis of the lens) and in a focusing direction (a direction of the optical axis of the lens). As a result, tracking servo (in which the laser light always traces on the track formed on the optical disc D) and focus servo (in which the laser light is always just focused on the recording layer of the optical disc D) are performed.

A CPU (Central Processing Unit) 21 comprehensively controls the optical disc apparatus 100 followed by an operation command supplied from the host device 25 via the interface circuit 24. The CPU 21 uses a RAM (Random Access Memory) 22 as a work area and operates followed by a control program recorded in a ROM (Read Only Memory) 23.

(An Internal Configuration of the Laser Control Circuit 31)

Figure 2:
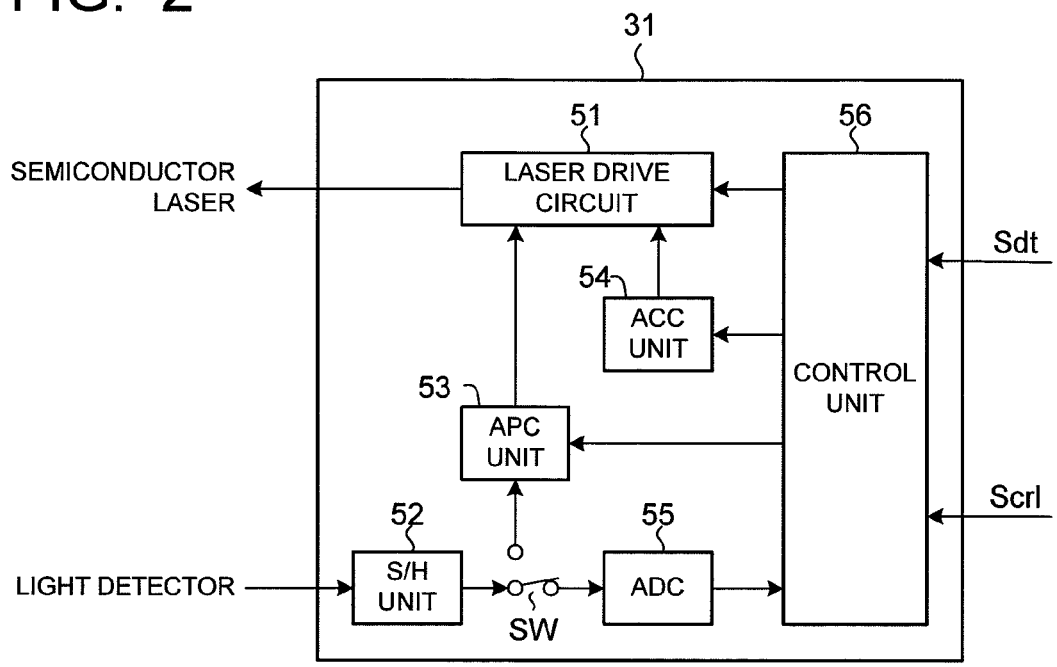
FIG. 2 is a block diagram showing an internal configuration of a laser control circuit 31

FIG. 2 is a block diagram showing an internal configuration of the laser control circuit 31. The laser control circuit 31 has a laser drive circuit 51, an S/H unit 52, an APC unit 53, an ACC unit 54, an ADC 55, a changeover switch SW, and a control unit 56.

The laser drive circuit 51 outputs the drive current Id to the semiconductor laser 32 based on a control from the control unit 56. The S/H (sample-hold) unit 52 samples the light power detection current Ip (a monitor signal) from the light detector 34, and holds (hold) it for a predetermined time, and outputs it as a sampling signal.

The APC (Automatic Power Control) unit 53 and the ACC (Automatic Current Control) unit 54 are used when the semiconductor laser 32 is driven in accordance with an APC (Automatic Power Control) and an ACC (Automatic Current Control). The APC and the ACC are switched in the control unit 56.

The APC (Automatic Power Control) unit 53 controls the laser drive circuit 51 based on the sampling signal from the S/H unit 52 to make the light power from the semiconductor laser 32 be constant (an APC drive). In the event, the drive current Id does not always become constant. The APC unit 53 has a peak (Peak) APC section and an erase (Erase) APC section (not shown). The peak APC section and the erase APC section respectively perform the APC drive for the semiconductor laser 32 to be a peak power and an erase power.

The ACC (Automatic Current Control) unit 54 controls the laser drive circuit 51 to make the drive current Id to the semiconductor laser 32 be constant (an ACC drive). In the event, the light power from the semiconductor laser 32 does not always become constant.

The ADC (Analog Digital Converter) 55 performs an A/D conversion for the sampling signal from the S/H (sample-fold) unit 52 and outputs it as a digital signal.

The changeover switch SW is a switch that switches to output the sampling signal from the S/H (sample-hold) unit 52 to either the APC (Automatic Power Control) unit 53 or the ADC (Analog Digital Converter) 55.

The control unit 56 controls the laser drive circuit 51, the APC unit 53, and the ACC unit 54. And it inputs the digital signal from the ADC (Analog Digital Converter) 55. The control unit 56 functions as elements as follows:

an obtaining unit to obtain a sensitivity coefficient;

a first deriving unit to derive a first monitor value in setting a light power of a semiconductor laser at a peak power;

a second deriving unit to derive a second monitor value in setting the light power of the semiconductor laser at an erase power;

a converting unit to convert the first and the second monitor values into first and second light power values based on the sensitivity coefficient;

a first calculating unit to calculate a ratio between the first and the second light power values;

a second calculating unit to calculate a correction coefficient; and a correcting unit to correct the light power of the semiconductor laser based on the correction coefficient.

(An Operation of the Optical Disc Apparatus 100)

Figure 3:
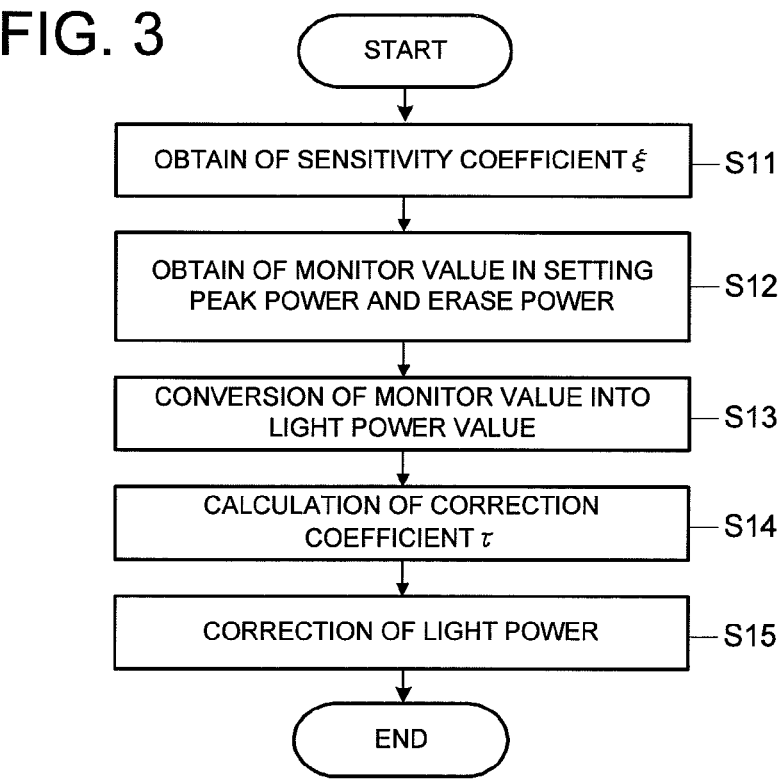
FIG. 3 is a flowchart showing one example of operational procedures of the optical disc apparatus 100

An operation of the optical disc apparatus 100 will be described. FIG. 3 is a flow chart showing one example of operational procedures of the optical disc apparatus 100.

In the procedures in FIG. 3, a deviation amount (the correction coefficient) from a setting value of a coefficient "ϵ" (a ratio between the peak power (Peak Power) and the erase power (Erase Power)) is calculated, and the light power is corrected by means of the correction coefficient.

(1) Obtaining Sensitivity Coefficients $\xi$ ($\xi\_slope$ and $\xi\_offset$) (Step S11)

Figure 4:
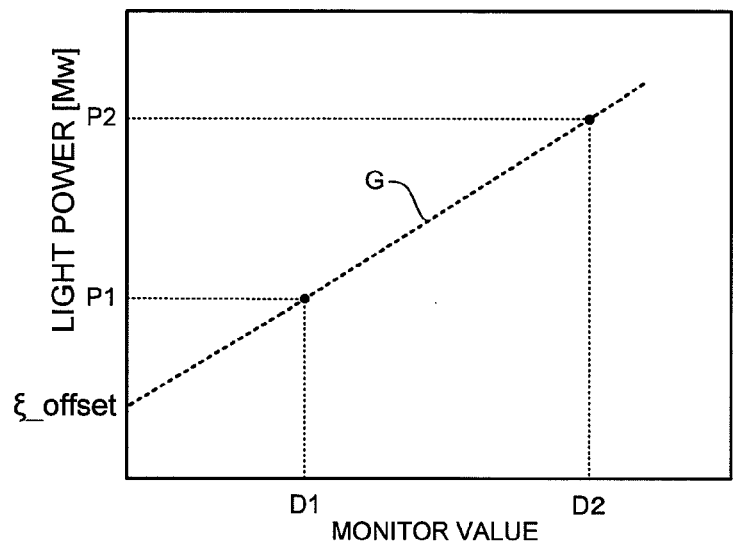
FIG. 4 is a view showing a graph G indicating a relation between a monitor value and a light power

The sensitivity coefficient $\xi$ is a coefficient indicating a relation (especially a linear relation) between the light power and a digital value (the monitor value). FIG. 4 is a view showing a graph G indicating the relation between the monitor value and the light power. A horizontal axis and a vertical axis of the view respectively correspond to the monitor value and the light power. The sensitivity coefficients $\xi\_slope$ and $\xi\_offset$ respectively correspond to a gradient and an intercept (an offset value) of the graph G. Namely, this example defines a linear expression that the sensitivity coefficient ξ indicates the relation between the monitor value and the light power.

The sensitivity coefficient ξ is obtained as follows.

The APC unit 53 drives the semiconductor laser 32 by means of the APC to obtain the relation between the light power of the semiconductor laser 32 and the monitor value. Namely, the ACC unit 54 is not used. In the event, either the peak APC section or the erase APC section in the APC unit 53 is selected appropriately. For example, the erase APC section is selected, and the semiconductor laser 32 is driven by means of the erase APC.

Light powers P1 and P2 are designated, and then the semiconductor laser 32 is driven by means of the APC, when digital values (the monitor value) D1 and D2 are obtained. Namely, the monitor signal from the light detector 34 is sampled and held in the S/H unit 52, and then A/D converted to be obtained as the digital value (the monitor value). The plural light powers P1 and P2 are designated, and monitor values D1 and D2 corresponding to the light powers P1 and P2 respectively are obtained. Note that a peak hold can be used instead of the sample hold.

Calculating the Sensitivity Coefficient ξ.

The sensitivity coefficient ξ is calculated based on the following expressions (1) and (2).

$$\xi\_slope=(P2-P1)/(D2-D1) \quad (1)$$

$$\xi\_offset=D2-\xi\_slope*P2 \quad (2)$$

A least squares method can be used instead of the expressions (1) and (2). For example, a monitor value D to equal to or more than three light powers P is obtained, and then the sensitivity coefficient ξ is calculated as the coefficient of the linear expression by means of the least squares method.

Here, the sensitivity coefficient ξ can be stored in a non-volatile memory (Non-Volatile Memory) for example, a flash memory in the optical disc apparatus 100. In the event, it is possible not to require obtaining the relation between the light power and the monitor value and calculating the sensitivity coefficient ξ.

(2) Obtaining the Monitor Value at the Time of Setting the Peak Power and the Erase Power (Step S12)

Next, monitor values D_peak, D_erase corresponding to the peak power and the erase power (setting values of the peak power and the erase power) used in recording are obtained. At this moment, it is desirable that the semiconductor laser 32 is driven with the drive current Id such as a monopulse and a castle pulse. It is easy to obtain a stable monitor value when the light power from the semiconductor laser 32 is constant for a predetermined time (accuracy improvement of the monitor value). At this moment, the semiconductor laser 32 is driven in the ACC unit 54 by means of the ACC. Namely, the APC unit 53 is not used.

Figure 5:
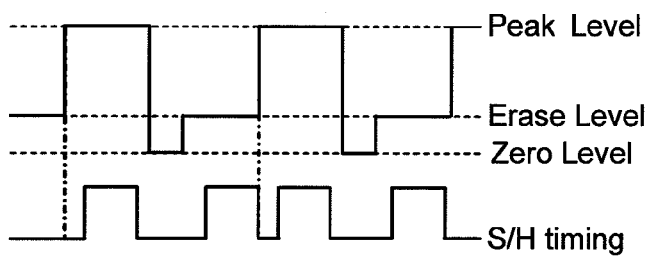
FIG. 5 is a view showing one example of a signal waveform in obtaining monitor values of a peak power and an erase power by means of sample-hold

For example, as shown in FIG. 5, the peak power and the erase power are respectively sampled and held in the S/H unit 52 using a waveform laser light (the drive current Id) including both of the peak power and the erase power (a peak level, an erase level) As a result, the monitor values D_peak and D_erase corresponding to the peak power and the erase power respectively are obtained.

Figure 6A:
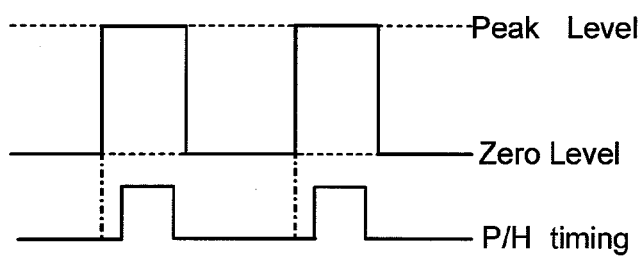
FIG. 6(A) is a view showing one example of the signal waveform in obtaining the monitor value corresponding to the peak power by means of peak-hold
Figure 6B:
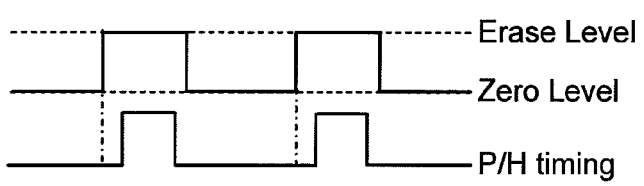
FIG. 6(B) is a view showing one example of the signal waveform in obtaining the monitor value corresponding to the erase power by means of peak-hold.

Herein, it is possible to use the peak hold (P/H) instead of the sample-hold (S/H). For example, as shown in FIG. 6(A) and FIG. 6(B), the monitor value is obtained using the waveform laser light (the drive current Id) including either one of the peak power and the erase power by means of the peak hold. Namely, the erase power is not let to output in measuring the monitor value corresponding to the peak power. And also, the peak power is not let to output in measuring the monitor value corresponding to the erase power. In this manner, the monitor values D_peak and D_erase corresponding to the peak power and the erase power respectively are obtained individually.

(3) Converting the Monitor Value into a Light Power Value (Step S13)

The monitor values corresponding to the peak power and the erase power (the setting values of the peak power and the erase power) used in recording are converted into light power values (actual measured values of the peak power and the erase power) P_peak_real and P_erase_real using the sensitivity coefficient ξ. Namely, the actual measured values P_peak_real and P_erase_real of the peak power and the erase power are respectively calculated in accordance with the following expressions (3) and (4).

$$P\_peak\_real=\xi\_slope*D\_peak+\xi\_offset \quad (3)$$

$$P\_erase\_real=\xi\_slope*D\_erase+\xi\_offset \quad (4)$$

Here, the setting value of the light power and the actual measured value do not always coincide. The setting value of the light power is the value used in controlling the semiconductor laser 32 in the control unit 56 and the like. On the other hand, the actual measured value of the light power is an actual light power of the semiconductor laser 32 calculated based on the monitor value Accordingly, inconsistency between the setting value and the actual measured value of the light power leads to control the light power insufficiently. The embodiment makes it possible to correct the light power and emit the set light power from the semiconductor laser 32.

(4) Calculating a Correction Coefficient τ (Step S14)

The correction coefficient τ is calculated as follows.

Calculating a Coefficient ε'

The coefficient ε' is calculated in accordance with the following expressions (5). The coefficient ε' indicates a ratio of the actual measured values between the peak power and the erase power.

$$\varepsilon' = \frac{P\_erase\_real}{P\_peak\_real} \quad (5)$$
$$= \frac{(\xi\_slope*D\_erase+\xi\_offset)}{(\xi\_slope*D\_peak+\xi\_offset)}$$

Calculating the Correction Coefficient τ

The correction coefficient τ is calculated in accordance with the following expression (6). The coefficient ε indicates a ratio of the setting values between the peak power and the erase power.

$$\tau=\varepsilon/\varepsilon' \quad (6)$$

(5) Correcting the Light Power (Step S15)

The light power can be corrected using the correction coefficient τ as follows.

In the case of controlling the erase power

An erase power P_erase can be corrected using the following expressions either (7) or (8).

$$P\_erase=P\_erase*\tau \quad (7)$$

$$P\_erase=P\_peak*\varepsilon*\tau \quad (8)$$

In the case of controlling the peak power

A peak power P_peak can be corrected using the following expressions either (9) or (10).

$$P\_peak=P\_peak*(1/\tau) \quad (9)$$

$$P\_peak = (P\_erase/\epsilon)*(1/\tau) \qquad (10)$$

Accordingly, either the light power or the coefficient $\epsilon$ can be corrected in the embodiment. For example, the light power is corrected in performing an OPC (Optic Power Calibration). It is common to perform the OPC using a PCA (Power Calibration Area) of the optical disc D prior to recording information on the optical disc D. The correction coefficient $\tau$ is calculated prior to the OPC. After that, the OPC is performed using either the correction coefficient $\tau$ or the corrected coefficient $\epsilon(=\epsilon*\tau)$. As the result, it is possible to improve the recording quality.

Correction of the light power is applicable except the OPC. Namely, calculation of the correction coefficient is not limited to prior to the OPC.

As described above, correcting the light power (especially, the peak power and the erase power) allows the recording quality of the optical disc D to improve. Besides, variations in controlling power (thus, a recording quality) in the discrete optical disc apparatus 100 are reduced.

Other Embodiments

Embodiments of the present invention are not limited to the above-described embodiment and can be expanded or altered, and expanded and altered embodiments are also included within a technical field of the present invention.

What is claimed is:

1. An optical disc apparatus, comprising:
    a semiconductor laser configured to irradiate an optical disc with a light;
    a light monitor configured to monitor an emitted light from the semiconductor laser;
    a computing module configured to compute a sensitivity coefficient indicative of a relation between a light power of the semiconductor laser and a monitor value in the light monitor;
    a first deriving module configured to derive a first monitor value when the light power of the semiconductor laser at a peak power level;
    a second deriving module configured to derive a second monitor value when the light power of the semiconductor laser at an erase power level;
    a convertor configured to convert the first and the second monitor values into first and second light power values based on the sensitivity coefficient;
    a first calculator configured to calculate a ratio between the first and the second light power values;
    a second calculator configured to calculate a correction coefficient based on a ratio between the peak power level and the erase power level and the ratio between the first and the second light power values; and
    a correcting module configured to correct the light power value of the semiconductor laser based on the correction coefficient.

2. The optical disc apparatus of claim 1,
    wherein the sensitivity coefficient is configured to indicate the relation between the light power value of the semiconductor laser and the monitor value in the light monitor when the semiconductor laser is controlled to keep the light power constant.

3. The optical disc apparatus of claim 1,
    wherein the first and the second monitor values are the monitor values in the light monitor when the semiconductor laser is controlled to keep a current constant.

4. The optical disc apparatus of claim 1,
    wherein the computing module comprises:
        a first computing module configured to compute the relation between the light power value of the semiconductor laser and the monitor value in the light monitor; and
        a second computing module configured to compute the sensitivity coefficient indicative of the computed relation.

5. The optical apparatus of claim 1, further comprising a storage module configured to store the sensitivity coefficient,
    wherein the computing module is configured to retrieve the sensitivity coefficient from the storage module.

6. A light power correcting method, comprising:
    computing a sensitivity coefficient indicative of a relation between a light power value of a semiconductor laser with a light and a monitor value in a light monitor when the semiconductor laser is irradiating an optical disc with a light;
    deriving a first monitor value when the light power of the semiconductor laser is at a peak power level;
    deriving a second monitor value when the light power of the semiconductor laser is at an erase power level;
    converting the first and the second monitor values into first and second light power values based on the sensitivity coefficient;
    calculating a ratio between the first and the second light power values;
    calculating a correction coefficient based on a ratio between the peak power level and the erase power level and the ratio between the first and the second light power values; and
    correcting the light power of the semiconductor laser based on the correction coefficient.

7. The light power correcting method of claim 6,
    wherein the sensitivity coefficient is configured to indicate the relation between the light power value of the semiconductor laser and the monitor value in the light monitor when the semiconductor laser is controlled to keep the light power constant.

8. The light power correcting method of claim 6,
    wherein the first and the second monitor values are the monitor values in the light monitor when the semiconductor laser is controlled to keep a current constant.

9. The light power correcting method of claim 6,
    wherein the computing comprises:
        computing the relation between the light power value of the semiconductor laser and the monitor value in the light monitor; and
        computing the sensitivity coefficient indicative of the computed relation.

10. The light power correcting method of claim 6,
    wherein the sensitivity coefficient is retrieved from a storage module.

* * * * *